United States Patent

Hoke

[15] 3,706,334
[45] Dec. 19, 1972

[54] TIRE TREAD

[72] Inventor: Gilbert J. Hoke, Kenmore, N.Y.

[73] Assignee: Dunlop Tire and Rubber Corporation, Buffalo, N.Y.

[22] Filed: Oct. 12, 1970

[21] Appl. No.: 80,139

Related U.S. Application Data

[62] Division of Ser. No. 750,387, June 27, 1968, abandoned.

[52] U.S. Cl.................................................152/209
[51] Int. Cl..............................................B60c 11/06
[58] Field of Search.....................152/209, DIG. 604

[56] References Cited

UNITED STATES PATENTS

| 3,055,410 | 10/1962 | Caulkins | 152/209 |
| 2,843,172 | 7/1958 | Berry et al | 152/209 |
| 2,268,344 | 12/1941 | Shesterkin | 152/DIG. 604 |

*Primary Examiner*—James B. Marbert
*Attorney*—Rauber & Lazar

[57] ABSTRACT

A pneumatic tire is provided with a tread having a traction pattern consisting of grooves and sipes. The tread pattern inhibits stone retention within the tread by suspending or cradling the stone spatially from the bottom of the groove or sipe. The grooves are provided with transverse crossbars or buttresses having a configuration and dimension relative to the groove to support or cradle a stone above the bottom of the groove.

The sipe, or traction-slit, is arranged with parallel side walls wherein a first portion extends from the tread surface radially inwardly, and a second portion is formed from segments extending from the first portion but diverted or angled to alternate sides of the mid-plane extending from the first portion. The segmented sections are provided in several forms which are either twisted, angled, turned or crimped for misalignment relative to the upper or first portion of the sipe.

4 Claims, 22 Drawing Figures

PATENTED DEC 19 1972

INVENTOR.
GILBERT J. HOKE
BY
Rauber & Lazar
his ATTORNEYS

INVENTOR.
GILBERT J. HOKE
BY Rauber & Lazar
his ATTORNEYS

INVENTOR.
GILBERT J. HOKE
BY
Rauber & Lazar
his ATTORNEYS 3,706,334

TIRE TREAD

This is a division of application Ser. No. 750,387, filed June 27, 1968 now abandoned.

BACKGROUND OF THE INVENTION

1. Field of the Invention

This invention relates to pneumatic tires and in particular to the traction pattern of the tire tread wherein the grooves and sipes are arranged to minimize stone pick-up and stone retention.

2. Description of the Prior Art

The rubber treads of pneumatic tires are commonly provided with a plurality of transversely spaced circumferentially continuous, relatively narrow, anti-skid grooves to increase the traction properties and flexibility of the treads. Such grooves are commonly made circumferentially straight or of a tortuous shape, i.e., zigzag, sinuous, etc.

The grooves of a tortuous shape are considered preferable for such a shape because such a shape provides a much greater groove edge effective for increasing the traction and anti-skid properties of the tread, and also presents the groove edges in various directions so as to increase the traction and anti-skid properties in all directions.

The rubber treads are also now customarily provided with slit-like grooves or traction-slits, more commonly called sipes, between the grooves and in the load-bearing ribs of the tire. The sipes increase the edge areas of the load-bearing portions and thereby improve the traction and other desirable characteristics of the tread pattern.

Thus, during wet-pavement conditions, sipes also function to dissipate water from the area of tire contact with the road thereby drying the road surface, producing a better gripping of the tread on the surface.

The portions of the siping below the surface of the tread are usually in the same plane and in alignment with the siping on the tread surface as seen by the viewer, i.e., the slot configuration of the pattern on the tread surface itself is identical with the slot configuration or pattern below the surface of the tread. The maximum depth of the siping that is desirable is provided for adequate road gripping so that throughout the wearing down or erosion of the tread the siping is maintained.

Certain problems occur with the siping heretofore used in certain tires, particularly when the siping was relatively deep extending inwardly of the tire tread towards the carcass upon which the tread is formed. This deep siping allows for foreign objects, especially stones, to enter into the siping openings in the tread surface early in the tire's life. Due to the narrowness and depth of the siping slots, the stones are held or trapped within the siping by the compression from the rubber on the sides or walls of the siping. Eventually these foreign objects are forced downwardly and finally against the bottom or base of the slots by the repeated pumping forces developed by the tire during its use. As the tire is subjected to use and wear, the foreign objects are subjected to additional forces or pressures as the thickness of the tire tread rubber decreases. Furthermore, additional foreign objects or stones may be trapped above the original object thereby exerting an additional inward pressure on the first or most inward foreign object. Such foreign objects having sharp edges or points cause rapid cutting and tearing of the side walls and bottom of the siping and penetrate the under tread rubber and damage or sever the tire cords of the carcass. Such damage causes premature tire failure of otherwise renders the tire unfit for recapping or retreading.

The problems with respect to the large grooves, more particularly, permit the foreign objects, such as stones, to enter into the groove early in the tire's life. The depth of the deep grooves allows the stones to be held or trapped by the compression of the rubber in the sides or walls of the ribs formed by adjacent grooves. Eventually the stones are forced against the bottom of the groove by pressure of the load on the tire and road surfaces. As the tire wears the stone is subjected to additional pressure as the depth of the tread rubber decreases or another stone may be trapped above the original one exerting pressure on the first stone. If the lodged stone has a point or sharp edge, the pressure may cause the stone to cut through or split the bottom of the groove to penetrate the under treaded rubber and the cords of the tire's carcass.

The grooves or sipes, or both, however, thus, have occasioned annoyance and damage as the result of picking up or holding stones and other hard objects of various sizes and dimensions. Problems relating to both the grooves and sipes still remain notwithstanding the many designs of grooves heretofore proposed.

It is the general object of this invention, therefore, to improve the traction pattern of pneumatic tires with respect to the stone rejection properties of the grooves and sipes.

SUMMARY OF THE INVENTION

According to the invention there is provided a pneumatic vehicle tire having a traction-pattern in the tire tread provided with grooves or sipes generally extending radially inwardly from the surface of the tire tread.

The grooves are provided with crossbars extending transversely across the bottom portion of the groove. The crossbars may be horizontal or parallel with respect to the tread surface merging with or perpendicularly into the side walls of the grooves. The crossbars may also extend upwardly forming buttresses against the side walls of the grooves as a crescentshaped crossbar merging gradually or tapering into the side wall spatially below, i.e., radially inwardly, of the tread surface. Furthermore, the crossbar may extend along the side wall of the groove to the tread surface forming in profile a U-shaped crossbar, preferably with the upper portions slightly tapered. The cross section of the crossbars may be in rectangular, curved or triangular form. The spacing between the crossbars is equal or less than the width of the crossbars.

Foreign objects of significant size, such as stones, that may penetrate the groove are suspended within the groove by being cradled by one or more adjacent crossbars. This suspension prevents the stone from penetrating deeper into the groove and eventually damaging the base of the groove by cracking the bottom or corners thereof or tearing further into the tread rubber eventually tearing or rupturing the carcass comprising the cords thereof. Such damage causes premature tire failure, such as blow-outs, or otherwise renders the tire unfit for recapping or retreading.

According to the invention further, the sipes are arranged in a conventional manner with parallel side walls extending inwardly from the tread surface to a desired depth. The parallel walls are then extended in segmented configuration, and each segment may be angled from the mid-plane of the upper portion of the sipe respectively to alternate sides of the plane extended from the sipe mid-plane. Alternatively, the segmented portions may be turned, twisted or crimped to establish a pattern that is, in effect, in misalignment, with respect to the upper tread portion defined by the upper sipe. Foreign objects, such as stones of size that penetrated into the sipe are cradled or suspended within the sipe above the lower segmented portions by the crotch of the sipe.

BRIEF DESCRIPTION OF THE DRAWINGS

The nature of the invention is hereinafter further explained in greater detail with reference to the accompanying drawings, forming a part of this application in which.

DESCRIPTION OF THE PREFERRED EMBODIMENTS

Figure 1:
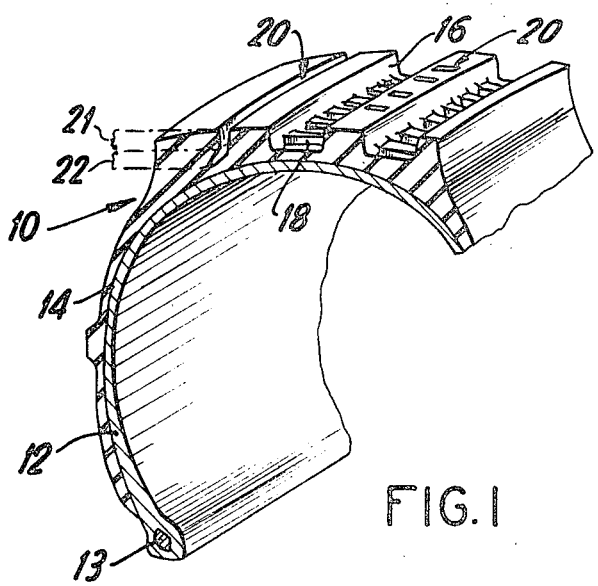
FIG. 1 is a perspective view, partly in section, of a pneumatic tire provided with a tread pattern according to the invention, having either or both the grooves and sipes.

Referring to the drawings and in particular to FIG. 1, there is shown a section of a pneumatic tire incorporating in the rubber tread 10 thereof several anti-skid grooves 16 and several sipes 20 formed in accordance with the present invention. While only several grooves and sipes are shown, it will be appreciated that as many sipes or grooves or both as may be desired may be provided.

The tire illustrated is otherwise of conventional construction and includes in addition to the rubber tread 10, rubber side walls 14, a fabric carcass 12 and annular bead wire bundles 13 to which the carcass is anchored during molding and vulcanizing of the tire. The tire may be fabricated and molded in a conventional manner and the anti-skid grooves 16 and sipes 20 are preferably formed in the tread 10 during molding thereof. The term rubber is used to denote natural rubber, synthetic rubber and blends thereof.

Figure 2:
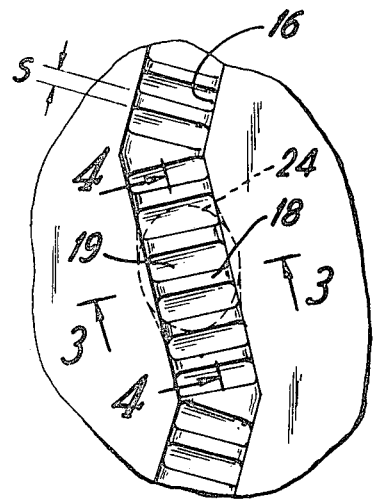
FIG. 2 is a plan view of a portion of a groove according to the invention.
Figure 3:
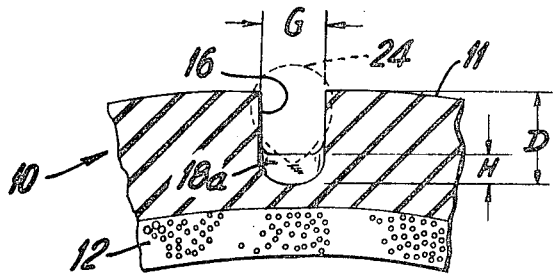
FIG. 3 is a sectional view of the groove taken on the section indicating line 3—3 of FIG. 2.
Figure 4:
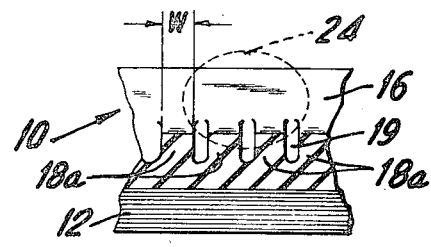
FIG. 4 is a sectional view of the groove taken on the section indicating line 4—4 of FIG. 2.

The groove 16, according to the invention, is provided with a plurality of crossbars 18 as shown in FIGS. 2, 3 and 4. The crossbars are preferably integrally formed from the bottom of the groove 16 and extend, across the groove from one side wall to the other. The crossbar 18a of FIGS. 3 and 4 is of the form that is generally parallel with the tread-surface 11. The width W (FIG. 4) or thickness of the crossbars may be varied as desired with relation to the height H (FIG. 3) of the crossbar above the bottom of the groove. Various combinations of the width (W) to depth (H) ratio can be used depending upon the groove width (G) and depth (D, FIG. 3) used. The spacing S (FIG. 2) between the crossbars 18 should be such as to assure the suspension of the stones or other foreign objects that may penetrate the groove and be retained therein. The stone is thereby cradled above the bottom of the groove by one or more of the crossbars.

According to the invention, the spacing 19 having a dimension S (FIG. 2) between the crossbars 18 should be not more than and preferably less than the width G (FIG. 3) of the groove. The width W of the crossbar will be selected in relation to its height H, and these dimensions relative to the groove width (G) and depth (D) are determined in accordance with design requirements as will be apparent and understood by those skilled in this art.

In general, the width W of the crossbar will approximate the dimension of the particle desired to be cradled from the bottom of the groove. The spacing S will be less than the width W and the height H will be such as to provide sufficient structural support of the particle to prevent it from cutting into or otherwise damaging the bottom of the groove. Considering the properties of the rubber usually used in this art, the height H (FIG. 3) should be no less than 1/32 inches and may be greater depending upon the degree of protection desired.

A stone 24, shown in dotted lines in FIGS. 3 and 4, which may have penetrated or been forced into the groove 16 and retained therein is shown suspended or cradled from the bottom of the groove by the several crossbars 18a. The dotted lines portions in the tread 10 indicate the form of the groove and the crossbar owing to the presence of the stone. Although the position of the stone 24 may be only temporary, since further movement of the tire over the road bed eventually causes the stone to be ejected, it will be appreciated that the stone 24 can be suspended or cradled in that position without being ejected and yet will not harm the bottom of the groove.

Figure 8:
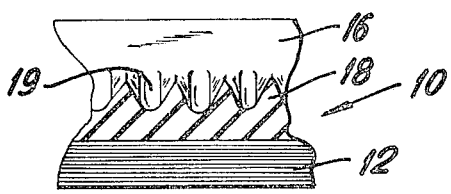
FIGS. 7 and 8 are sectional views similar to FIG. 4 showing other forms of crossbars in the grooves.
Figure 7:
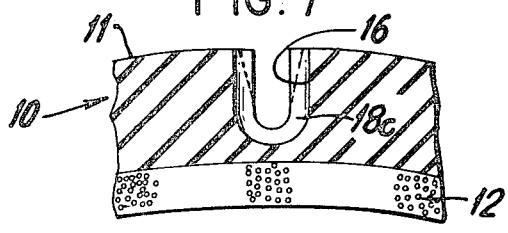

The cross-sectional form of the crossbars 18 may be any of several configurations, such as the rectangular form shown in FIG. 4, the semi-circular or curved form shown in FIG. 7, as well as the triangular form shown in FIG. 8.

Figure 5:
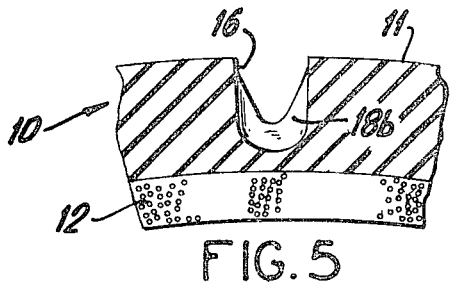
FIGS. 5 and 6 are sectional views of the groove similar to FIG. 3 showing a modification of the crossbars in the grooves.
Figure 6:
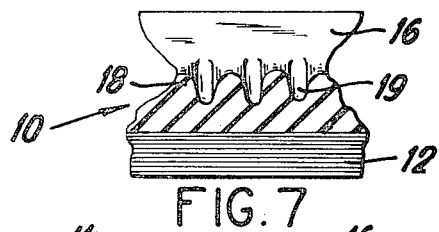

A modification of the crossbars of the invention is shown in profile in FIG. 5, in a view otherwise similar to FIG. 3. The crossbars, for this form indicated as 18b, are crescent-shaped disposed, as a rib, laterally across the bottom of the groove and extending radially outwardly from the bottom of the groove and against both side walls serving in effect as buttresses thereof and terminating at the side walls at a place below the tread surface 10. Such buttresses may also be arranged to terminate at the surface of the tread which surface may extend inwardly of the groove. Also, the crossbar may be a full rib extending throughout the walls of the groove, terminating at the tread surface and having a uniform height and width. Such a form (18c) is shown in FIG. 6. The dotted lines indicate a taper of the upper portion of the crossbar that may be provided. Such forms of crossbars provide V-shaped or U-shaped cradles or suspension structure for stones which prevents thereby deeper penetration of the stone and which eventually may effect rejection of the stone radially outward from the groove. It should be especially noted, as above indicated, that the stone need not be ejected from the groove. Indeed, the stone may be retained in position, cradled harmlessly from the bottom of the groove, throughout the life of the tire by the crossbar and the side walls of the groove.

It will be appreciated that the crossbars according to the invention effectively extend the useful depth of a groove which depth would otherwise be prohibitive if, for example, the remaining tread rubber to the carcass were critically thin. Groove channel depth of the non-skid type can thus be made to more desirable depths than heretofore for longer-life-traction requirements and yet obviate the damage caused by stones.

Figure 9:
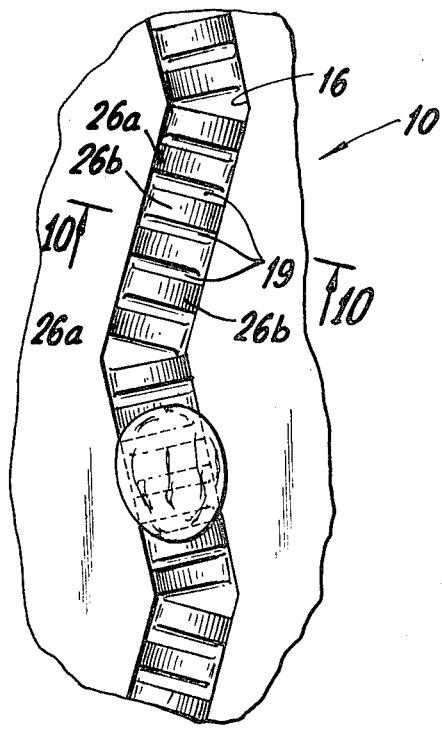
FIG. 9 is a plan view of the groove showing another example of the tire groove of the invention wherein the crossbars are arranged in an alternate configuration, buttressing the respective opposing walls of the groove.
Figure 10:
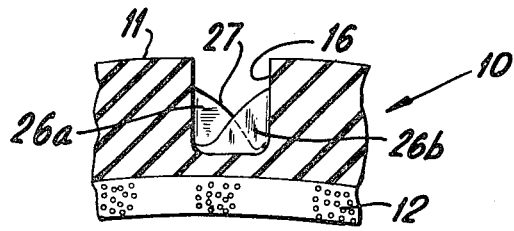
FIG. 10 is a sectional view of the groove taken on sectional line 10—10 of FIG. 9.
Figure 11:
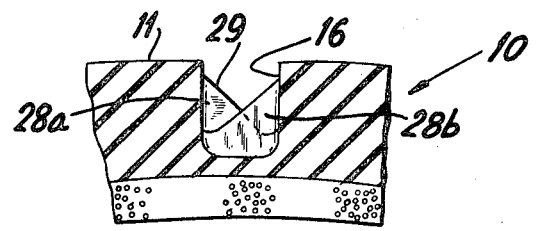
FIGS. 11 and 12 are sectional views similar to FIG. 10 showing alternate forms of the crossbars in the tire groove.
Figure 12:
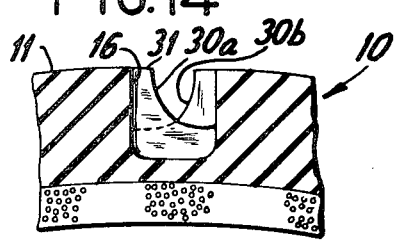

Referring now to FIGS. 9 through 11, there is shown other forms of crossbars according to the invention shaped as buttresses disposed alternately respectively to opposite walls along the longitudinal direction of the groove. The crossbars 26a and 26b extend from one lower side wall portion of the groove 16 laterally across the groove and slope upwardly into the opposite wall, merging therein at a location spatially radially inwardly from the tread surface 11. The upper surface 27 of the crossbars 26a and 26b may be curved outwardly in profile as shown in FIG. 10 or may be linear 29 as shown in FIG. 11 for the crossbars 28a and 28b. The alternating crossbars may also be arranged to extend to tread surface 11 as shown in FIG. 12. The crossbars 30a and 30b curve from a lower portion of one side wall of the groove 16 upwardly across the groove to the plane of the tread surface and connect to the opposite side wall by a flat portion 31. The cross-sectional form of the crossbars 26, 28 and 30 may also be shaped as shown in FIGS. 4, 7 and 8 as described above with respect to the crossbars of FIGS. 3, 5 and 6.

Referring now to FIGS. 13 through 22, there are shown sipes according to another feature of this invention. The sipe or traction-slit 20 is formed or cut into the crown of the tread of the tire in the rib portion thereof formed between adjacent grooves. The grooves may be of conventional form or in accordance with the form 16 of the present invention as described herein above.

The slots of the sipe may extend into the tread any desired depth but usually approximating 25 to 90 percent of the total thickness or depth of the tire tread 10. Also, it is the usual practice to form the walls of the sipe so as to be parallel. It will be understood, however, that the sipe may extend into the tread at angles approaching 15° from the radial plane of the tire and the sipe of this invention may be used in such configurations. Further, it has been the usual practice to extend certain alternate portions of a sipe deeper than intermediate portions in order to strengthen and support surrounding rubber tread elements. Thus, tearing and chunking out rubber elements adjacent the sipe by the stress or strain on the sipes owing to high centrifugal forces or high acceleration in braking forces are prevented. Nevertheless such forms of sipe allow for entrapment and deep penetration of stones which become embedded in the sipe to be eventually forced inwardly through the bottom of the sipe tearing it and thereafter cutting into the carcass of the tire. According to the invention, this problem is solved and the stones are inhibited or virtually prevented from deep penetration into the tread.

Referring to FIG. 1, the upper portion 21 of the sipe 20 is formed in a conventional manner. The lower portion 22 is formed in accordance with one embodiment of the invention by segmenting the sipe-forming element and angling or diverting the segmented elements radially inwardly from the plane of the upper sipe to alternate positions about the radially inwardly extended mid-plane of the upper sipe portion 21.

Figure 13:
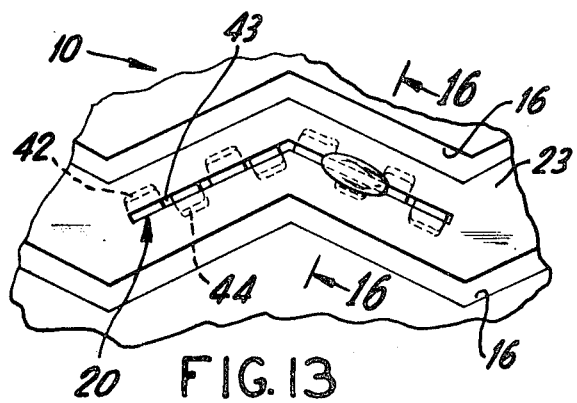
FIG. 13 is a plan view of one form of sipe according to the invention shown disposed in the rib formed by adjacent grooves.
Figure 14:
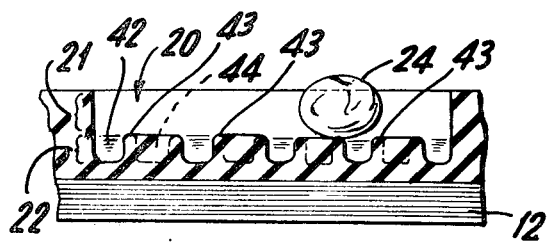
FIG. 14 is a sectional view of the sipe taken on the section indicating line 14—14 of FIG. 16.
Figure 16:
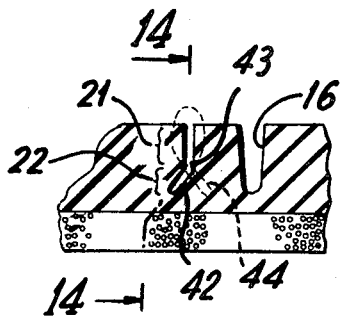
FIG. 16 is a sectional view of the sipe taken on the section indicating line 16—16 of FIG. 13.

Referring particularly to FIGS. 13, 14 and 16, a sipe 20 is shown formed in the rib 23 between grooves 16. Segmented portions 42 and 44 are disposed or angled on opposite sides of the mid-plane formed by the extension of the upper sipe portion 21. The sipe segments 42 and 44, etc., are generally rectangular in elevation. A stone 24 is shown suspended in the upper portion of the sipe 21 on adjacent segmented portions and the crotch 43 formed at the junctions of the adjacent segmented portions. The stone is thereby prevented from further penetration into the lower sipe portion 22 owing to such cradle action and also to the walls of the sipe serving as a restriction by the abrupt change in direction of the lower sipe wall portion relative to the upper sipe wall portion. Further stone penetration is prevented as well by the dimension of a given segment 42, 44, etc., being smaller than any stone of significant size which may have penetrated the sipe.

Figure 17:
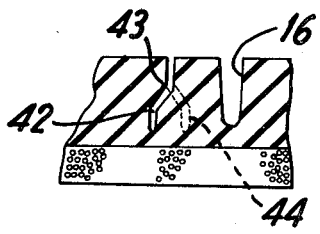
FIGS. 17 and 18 show in section similar to FIG. 16 other forms of sipes according to the invention.
Figure 18:
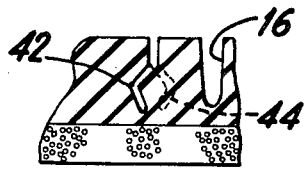
Figure 19:
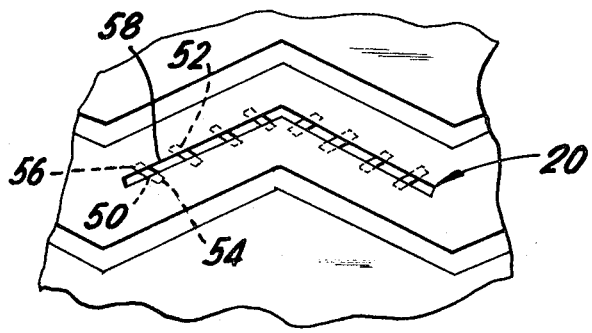
FIG. 19 and similar but fragmentary portions thereof.

The segmented legs 42 and 44 may be angularly diverted as shown, for example, in FIG. 17 wherein the segments 42 and 44, in end-view, are dog-legged from the upper portion 21. FIG. 18 shows a dog-leg of a sharper angle.

It should be noted, with respect both to sipes, as well as the grooves according to the invention, that stones or other foreign objects of significant size are potentially harmful when their size approaches or approximates the width dimension of the groove or sipe. Thus, very small stones relative to the opening of the groove will be of no serious consequence or problem with respect to cutting the bottom of the groove as they cannot be retained by the side walls of the groove.

Likewise, large stones cannot penetrate the sipes, and fine stones of dimensions much less than a sipe are not a problem since the sipe would not, in general, retain or entrap such fine particles. It is thus to be understood that the stones that are prevented from retention or entrapment by the grooves and sipes of this invention are of "significant" size relative to the dimension of the groove or sipe.

Figure 15:
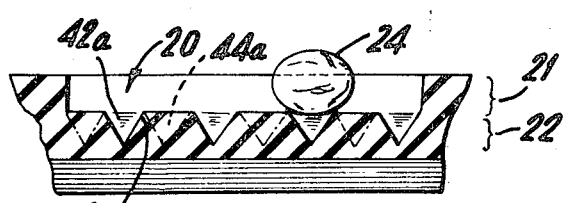
FIG. 15 is a view similar to FIG. 14 showing an alternative form thereof.

FIG. 15 is another form of angled segmented sipe similar to that of FIG. 14 wherein the lower portions 42a and 44a are triangular in elevation.

In general, according to the invention, various configurations of sipe below the upper portion 21 may be provided by turning, twisting or crimping the sipe-forming segmented elements to form the sipe portions 50, 52, etc., or angling such sipe-forming elements alternately on opposite sides of the mid-plane of the extension of the upper sipe. For example, referring to FIG. 19, a plan view of a sipe 20 is shown with the sub-surface sipe-element 50 and 52 twisted so that one edge 54 of the element 50 is disposed on one side of the sipe mid-plane 20 and the other edge 56, of the same segmented element 50 is disposed on the opposite side of the mid-plane of the sipe 20. The junction 58 of the adjacent segmented portions forms a crotch serving to support a cradled stone as described previously herein.

Figure 20:
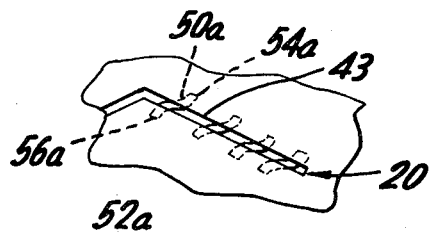
FIGS. 20, 21 and 22, show other forms of sipes according to the invention.

Another form of lower sipe-segment is shown in fragmentary plan view FIG. 20, showing elements 50a, 52a, etc., formed into an S-shape wherein the end portions 54a and 56a of each segment are disposed in the respective positions as shown.

Figure 21:
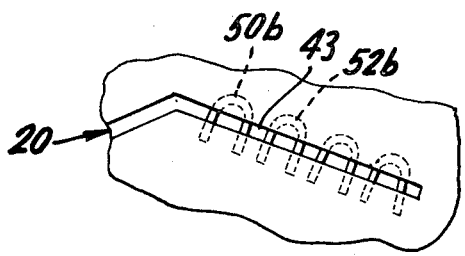
Figure 22:
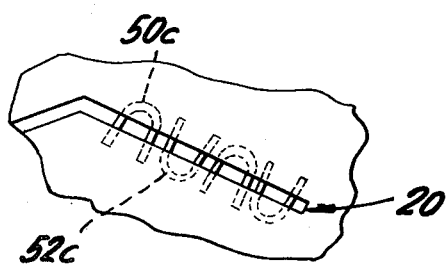

Still another form of lower sipe-segment is shown in FIG. 21 wherein segmented elements 50b, 52b, etc. are crimped, being generally U-shaped in cross-section. FIG. 22 shows similar crimping of elements 50c and 52c but in symmetrical alternating arrangement.

It will now be appreciated that the sipes and grooves according to the invention serve to inhibit, if not substantially prevent, the retention of foreign objects, such as stones that may be picked up and the consequent penetration of such objects deep into the tire tread to fracture the tread or otherwise damage the carcass. Any stones that are retained in the groove or sipe are cradled harmlessly from the bottom thereof. Furthermore, as the tread surface wears, the crossbars and sub-surface sipes will serve as addition traction edges to thereby prolong more effectively the traction-life of the tire.

Although several preferred forms of the invention have been described, it will be apparent that modifications may be made therein by those skilled in the art without departing from the scope of the invention as set forth in the appended claims. It should, thus, be understood that either the sipes, alone, or the grooves, alone, may be used in combination respectively with conventional tire treads otherwise not having the features as herein described and claimed respecting the stone rejecting features.

What is claimed is:

1. A tire comprising a tread provided with a plurality of grooves forming between them a plurality of load-bearing ribs and a plurality of sipes in said ribs, said sipes each having walls substantially parallel to each other, said sipes further comprising a first portion extending radially inwardly from the rib surface and a second portion comprising segments extending radially inwardly from the first portion, the longitudinal plane of at least the part of each of the segments adjacent to the first portion being disposed at an angle to the longitudinal plane of the first portion and at least a portion of the segments of said second portion lying alternately on one side of the longitudinal plane of the first portion and then on the other side.

2. The tread according to claim 1 wherein each segment is twisted whereby its surface is a warped plane generated by an angular rotation of the plane along the longitudinal axis of the segment.

3. The tread according to claim 1 wherein each segment is bent at least once about an axis parallel to the tread surface.

4. The tread according to claim 1 wherein each segment is crimped whereby the contour of said segment is generally U-shaped in cross-section.

* * * * *